US009501522B2

(12) United States Patent
Zhao et al.

(10) Patent No.: US 9,501,522 B2
(45) Date of Patent: Nov. 22, 2016

(54) SYSTEMS AND METHODS FOR PROVIDING A UNIFIED VARIABLE SELECTION APPROACH BASED ON VARIANCE PRESERVATION

(71) Applicant: SAS Institute Inc., Cary, NC (US)

(72) Inventors: Zheng Zhao, Cary, NC (US); James Cox, Cary, NC (US); David Duling, Durham, NC (US); Warren Sarle, Gainesville, FL (US)

(73) Assignee: SAS Institute Inc., Cary, NC (US)

( * ) Notice: Subject to any disclaimer, the term of this patent is extended or adjusted under 35 U.S.C. 154(b) by 388 days.

(21) Appl. No.: 13/970,459

(22) Filed: Aug. 19, 2013

(65) Prior Publication Data
US 2014/0059073 A1 Feb. 27, 2014

Related U.S. Application Data

(60) Provisional application No. 61/684,231, filed on Aug. 17, 2012, provisional application No. 61/801,410, filed on Mar. 15, 2013.

(51) Int. Cl.
*G06F 17/30* (2006.01)
(52) U.S. Cl.
CPC ... *G06F 17/30424* (2013.01); *G06F 17/30539* (2013.01); *G06F 17/30979* (2013.01)
(58) Field of Classification Search
CPC .................. G06F 17/30424; G06F 17/30979; G06F 17/30539
USPC ................................................ 707/769, 776
See application file for complete search history.

(56) References Cited

U.S. PATENT DOCUMENTS

| | | | | | |
|---|---|---|---|---|---|
| 5,386,370 | A | * | 1/1995 | Woo | G01S 5/04 342/126 |
| 5,944,779 | A | * | 8/1999 | Blum | G06F 9/466 709/201 |
| 5,959,574 | A | * | 9/1999 | Poore, Jr. | G01S 13/726 342/96 |
| 6,877,387 | B1 | * | 4/2005 | Certon | G01F 1/712 73/861.29 |
| 7,673,295 | B1 | * | 3/2010 | Lin | G06F 8/445 717/119 |
| 7,792,895 | B1 | * | 9/2010 | Juffa | G06F 17/16 708/607 |
| 2003/0176931 | A1 | * | 9/2003 | Pednault | G06F 17/30539 700/31 |

(Continued)

OTHER PUBLICATIONS

SAS Institute Inc. (2012) "SAS® High-Performance Analytics 1.3: User's Guide" SAS Institute Inc., Cary NC, 552 pages, http://supportprod.unx.sas.com/documentation/solutions/hpa/13/hpaug.pdf.

*Primary Examiner* — Vincent Boccio
(74) *Attorney, Agent, or Firm* — Kilpatrick Townsend & Stockton LLP

(57) ABSTRACT

This disclosure describes a method, system and computer-program product for parallelized feature selection. The method, system and computer-program product may be used to access a first set of features, wherein the first set of features includes multiple features, wherein the features are characterized by a variance measure, and wherein accessing the first set of features includes using a computing system to access the features, determine components of a covariance matrix, the components of the covariance matrix indicating a covariance with respect to pairs of features in the first set, and select multiple features from the first set, wherein selecting is based on the determined components of the covariance matrix and an amount of the variance measure attributable to the selected multiple features, and wherein selecting the multiple features includes executing a greedy search performed using parallelized computation.

72 Claims, 8 Drawing Sheets

(56) References Cited

U.S. PATENT DOCUMENTS

| | | | |
|---|---|---|---|
| 2003/0211486 A1* | 11/2003 | Frudakis | C12Q 1/6883 435/6.16 |
| 2005/0181386 A1* | 8/2005 | Diamond | G01N 33/6893 435/6.11 |
| 2006/0173663 A1* | 8/2006 | Langheier | G06F 19/3437 703/11 |
| 2009/0123077 A1* | 5/2009 | Imaoka | G06K 9/6235 382/205 |
| 2009/0131803 A1* | 5/2009 | Heneghan | A61B 5/4812 600/484 |
| 2010/0118715 A1* | 5/2010 | Gu | H04L 41/142 370/252 |
| 2010/0205124 A1* | 8/2010 | Ben-Hur | G06K 9/6215 706/12 |

* cited by examiner

SYSTEMS AND METHODS FOR PROVIDING A UNIFIED VARIABLE SELECTION APPROACH BASED ON VARIANCE PRESERVATION

CROSS REFERENCE TO RELATED APPLICATIONS

The present application is a non-provisional of and claims the benefit of priority under 35 U.S.C. 119(e) of U.S. Provisional App. No. 61/684,231 filed Aug. 17, 2012, and U.S. Provisional App. No. 61/801,410 filed Mar. 15, 2013, both of which are entitled "Systems and Method For Providing a Unified Variable Selection Approach Based on Variance Preservation". The entire contents of both such provisional applications are incorporated herein by reference for all purposes.

BACKGROUND

Aspects of the disclosure relate to efficiently selecting explanatory or predictive features in a parallelized computing environment.

Feature selection is an effective technique for dimensionality reduction and relevance detection. It may be used to improve the accuracy, efficiency and interpretability of learning models. Feature selection has been used as a valuable component of successful data mining applications in a variety of fields, including text mining, image processing, and genetic analysis, to name a few.

Continual advances in computer-based technologies have enabled corporations and organizations to collect data at rapidly increasing pace. Accumulated business and scientific data from many fields, such as finance, genomics, and physics, are often measured in terabytes ($10^{12}$ bytes). The enormous proliferation of large-scale data sets brings new challenges to data mining techniques and may require novel approaches to address the big-data problem in feature selection.

BRIEF SUMMARY

This disclosure describes a method which include accessing a first set of features, wherein the first set of features includes multiple features, wherein the features are characterized by a variance measure, and wherein accessing the first set of features includes using a computing system to access the features, determining components of a covariance matrix, the components of the covariance matrix indicating a covariance with respect to pairs of features in the first set, and selecting multiple features from the first set, wherein selecting is based on the determined components of the covariance matrix and an amount of the variance measure attributable to the selected multiple features, and wherein selecting the multiple features includes executing a greedy search performed using parallelized computation.

This disclosure also describe a system comprising one or more processing units, one or more non transitory computer readable storage mediums comprising instructions configured to cause the one or more processing units to perform operations including accessing a first set of features, wherein the first set of features includes multiple features, and wherein the features are characterized by a variance measure, determining components of a covariance matrix, the components of the covariance matrix indicating a covariance with respect to pairs of features in the first set, and selecting multiple features from the first set, wherein selecting is based on the determined components of the covariance matrix and an amount of the variance measure attributable to the selected multiple features, and wherein selecting the multiple features includes executing a greedy search performed using parallelized computation.

This disclosure also describes a computer program product, tangibly embodied in a machine readable non transitory storage medium, including instructions configured to cause a data processing apparatus to perform operations comprising accessing a first set of features, wherein the first set of features includes multiple features, and wherein the features are characterized by a variance measure, computing determining components of a covariance matrix using parallelized computation involving multiple worker nodes, the components of the covariance matrix indicating a covariance with respect to pairs of features in the first set, selecting multiple features from amongst the features of the first set, wherein selecting is based on the computed determined components of the covariance matrix and an amount of the variance measure attributable to the selected selected multiple features, and wherein the amount of the variance measure attributable to the selected features is determined by executing a greedy search performed using parallelized computation involving the multiple worker nodes.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
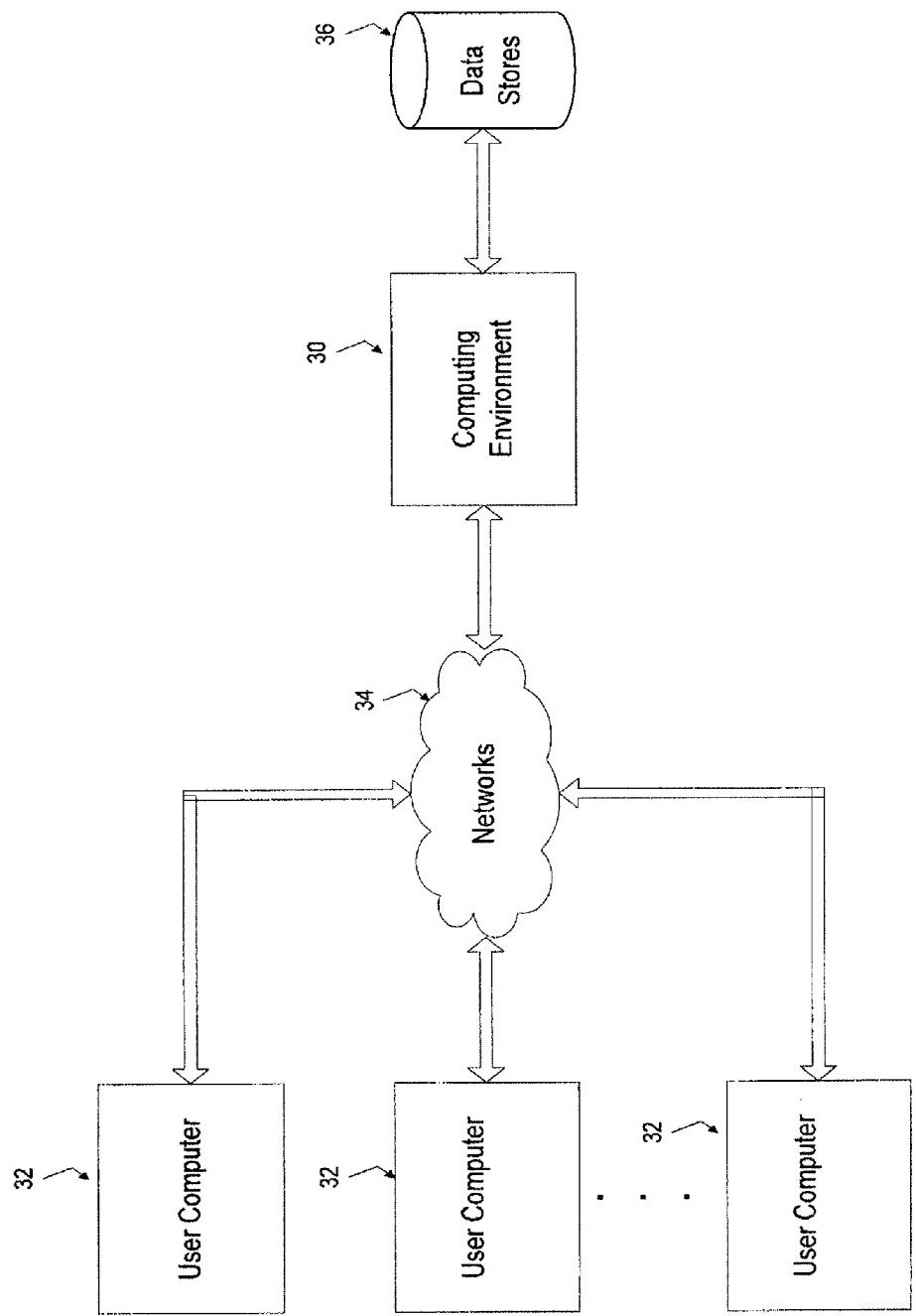
FIG. 1 illustrates an example operating environment within which a parallelized feature selection system of the present disclosure may be used.

This disclosure describes parallel computing systems for handling large scale problems in feature selection. The computing systems can select a subset of features that best explain (preserve) the variance contained in the data, and can perform either unsupervised or supervised feature selection. For the supervised case, the systems support both regression and classification.

The systems of this disclosure are designed in view of mathematically-depicted variable selection formulations for preserving variance in the case of classification, linear regression, and unsupervised learning. Each of the formulations is associated with an optimal solution which can be obtained only by solving a combinatorial optimization problem which is NP-hard (nondeterministic polynomial-time hard). However, this disclosure details a parallelized computing system that applies a decomposition technique to each formulation. These decomposition techniques are based on the sequential forward selection (SFS) strategy. The systems disclosed herein execute efficient solvers which use the decomposition technique to achieve high-quality, suboptimal formulation solutions for high-performance, parallelized feature selection in different modeling contexts. Moreover, the systems achieve these solutions in polynomial time.

The systems disclosed herein are highly adaptable, and can be used to perform feature selection for models used in financial forecasting, risk evaluation, fraud detection, economic forecasting, weather forecasting, insurance pricing, business strategizing and planning, or any other activity in which model performance depends on identifying a most informative subset of variables from within a variable superset of significant cardinality. For example, in a regression setting, the systems can be used to analyze a large set of independent variables believed to have predictive value for forecasting a dependent variable. Based on the analysis, the systems may then determine a limited number of variables which are the most predictive variables of the set. The system may then use the identified dependent variables to forecast the dependent variable using a regression model.

As has been widely recognized, redundant features increase data dimensionality unnecessarily and worsen the performance of learning models. The systems of this disclosure select features by evaluating feature subsets and can therefore effectively minimize the selection of redundant features. For parallel feature selection, the computations used by the systems are fully optimized and parallelized based on data partitioning. The systems can execute analytics procedures which facilitate reading data in a distributed form and performing parallel feature selection in both symmetric multiprocessing (SMP) mode via multithreading and massively parallel processing (MPP) mode via MPI.

The systems of this disclosure use data partitioning to achieve scalability. Because data partitioning is used, the parallel processing units do not have to access the entire data, and computations on the data can be distributed.

Also the systems and methods of this disclosure iteratively select features such that a closed form solution results from each selection step, resulting in efficiency gains being achieved. Moreover, the systems disclosed herein are the first distributed parallel processing systems capable of performing unsupervised feature selection.

The systems disclosed herein have several additional capabilities. For example, the systems use algorithms that run in polynomial time and involve only computational steps that can be performed using basic matrix operations. Additionally, the algorithms employed by the systems enable parallelization of all expensive computation steps, based on either a symmetric multithreading or massively parallel processing via distributed computing arrangement.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

FIG. 1 discloses an example network arrangement that may be used to access and operate the system of the present disclosure. FIG. 1 depicts several user computers 32 which may access a computing environment 30 through a network. The computing environment may be an environment within which parallelized computing may be performed. The environment may involve any number or arrangement of computers sufficient for parallelized computing to be carried out within the environment. Thus, for example, the environment may involve any number of computers, processors, or multi-threaded processors configured to perform computations in parallel, and in accordance with commands and synchronization provided by a controlling thread, processor, or other computing platforms. Any or all of the computing entities within the computing environment 30 may have access to the data stores depicted at 36.

Moreover, a feature selection system 300 (depicted in FIG. 3A) may reside and operate within the computing environment 30. Any or all of the computing entities within the computing environment 30 may be operated as part of the feature selection system 300. User computers 32 may serve as an interface to the feature selection system, and users may provide control inputs and parameters to the feature selection system in this way. Additionally, when the feature selection system is used to select features, the selected features and data representative of the selected features may be displayed on any one of the user computers 32 used to provide inputs to the system.

The data stores 36 may hold a vast breadth of variable observations accessible by the feature selection system. By way of example only, the data stores 36 may hold financial data, business analytics data, crime data, transactional data, medical data, or any other type of data which might be of relevance for data-mining, predictive modeling, classification, investigation, academic studies, forecasting, or other analytical purposes. Through access to the data stores, the computing entities may access data sets used to perform feature selection. The computing entities may be able to access data in matrix or vector form, such that each column, row or vector contains only observations which are representative of a common feature.

Also, the data stores may be formatted such that any of the computing entities are able to access equally-sized partitions of a comprehensive data set, for the purpose of selecting features represented within the comprehensive data set.

Figure 2:
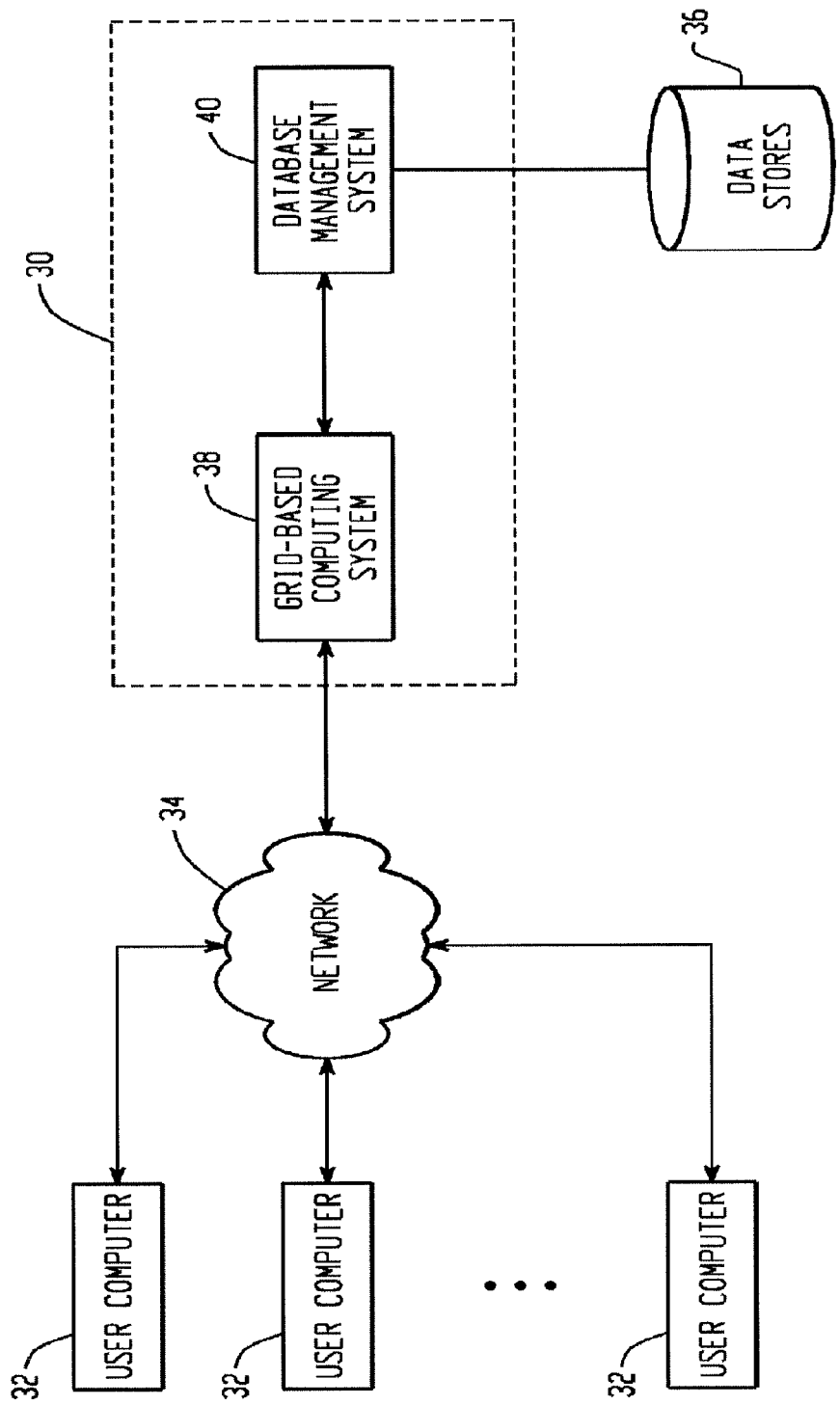
FIG. 2 illustrates an example operating environment within which a parallelized feature selection system of the present disclosure may be used.

FIG. 2 provides a more detailed look at certain components of the computing environment 30. As depicted in FIG. 2, the computing environment 30 may include a grid computing system 38 and a database management system 40. The grid computing system 38 may include multiple computers which are configured to share data with other computers in the grid system and to perform parallel processing based on commands provided by a central or controlling computer in the grid computing system 38. The feature selection computing system (depicted in FIG. 3) may involve one or more of these computers.

However, it shall be understood that the feature selection system need not involve a grid-based system such as the one depicted at 38. Rather, the feature selection system may involve any arrangement of processing entities configured to perform parallelized computations. Regardless of the arrangement of processing entities used by the feature selection system, this disclosure will hereinafter refer to computing entities which perform parallel processing as "worker nodes". A processing entity which is not a worker node, but which collects data from worker nodes and performs other processing for feature selection will be referred to hereinafter as a "control node".

Figure 3A:
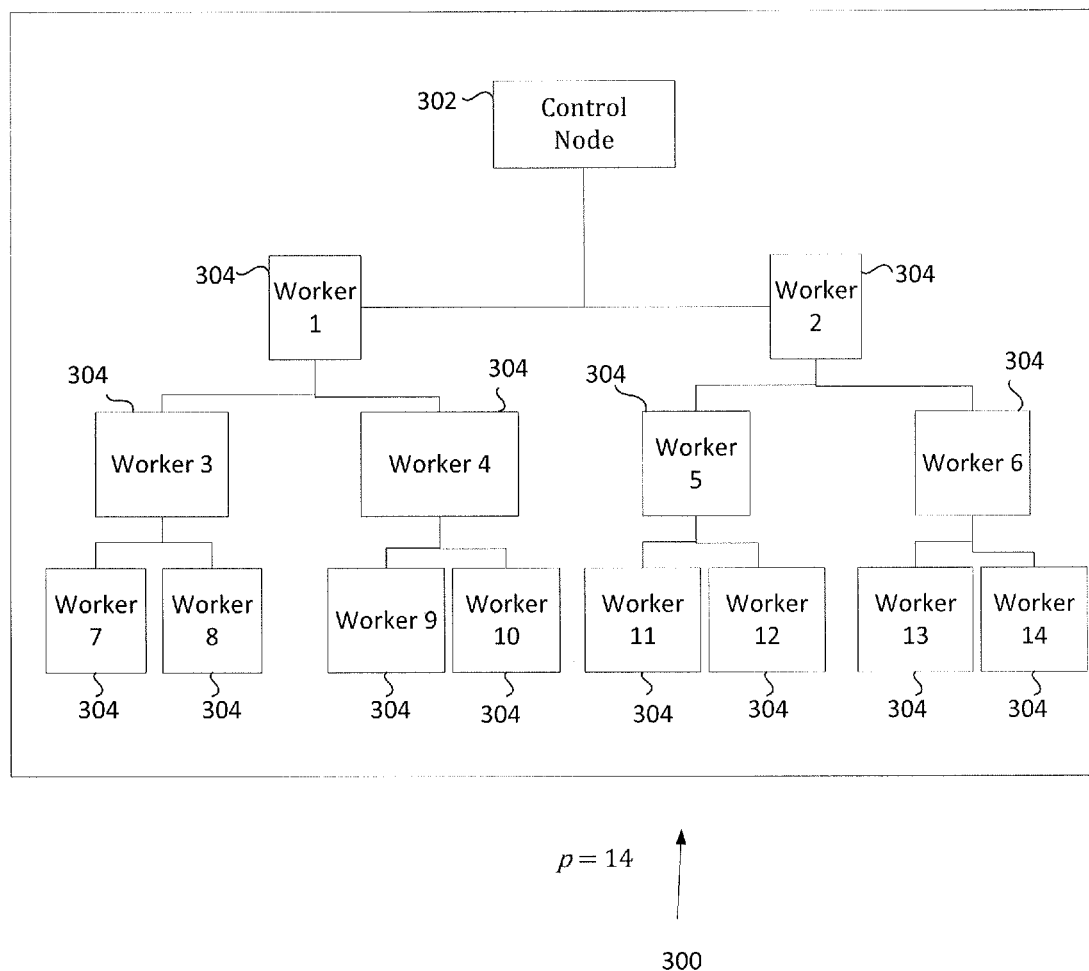
FIG. 3A illustrates an example arrangement of computing entities within a parallelized feature selection system of the present disclosure.

FIG. 3A depicts an example feature selection system 300 within the computing system 38. The system includes one control node 302, and fourteen worker nodes 304. As depicted in FIG. 3A, the symbol p will be used hereinafter to represent the number of worker nodes operating within feature selection system 300. Also, the worker nodes 304 are shown arranged in a tree-based communication hierarchy. Such a hierarchical arrangement of worker nodes may be used to reduce the time required for system 300 to perform feature selection. However, the techniques of this disclosure can be advantageously applied by a feature selection system 300 in which nodes are not arranged in a tree-based hierarchy. This disclosure shall be understood as being directed to any such parallelized computing environment, regardless of whether a tree arrangement is used in any way. Additionally, it shall be understood that this disclosure is directed to parallel processing systems which use any of the techniques herein, regardless of how many control nodes or worker nodes operate within the system.

Figure 3B:
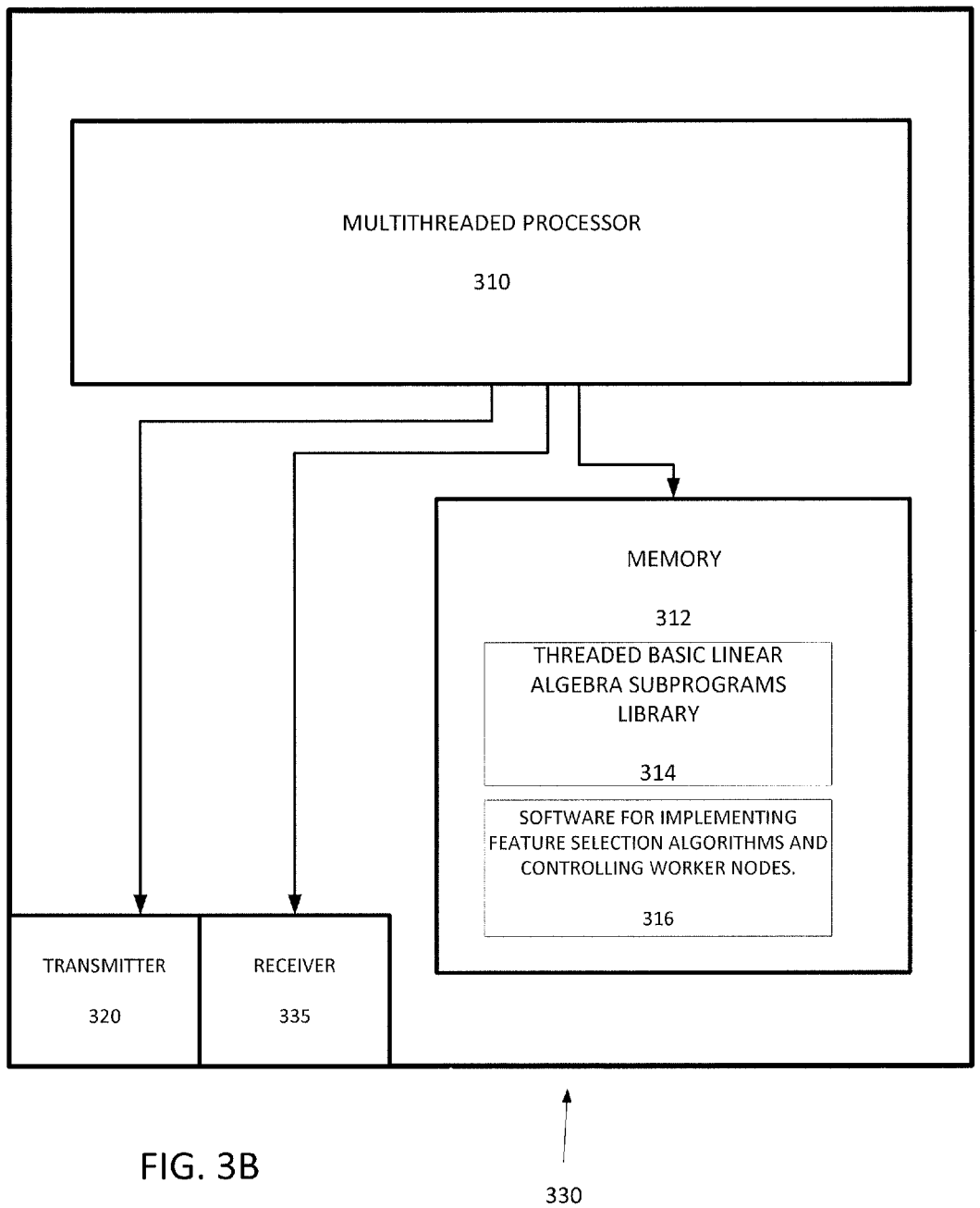
FIG. 3B illustrates a computing entity which may be suitably used as a control node within the parallelized feature selection system of the present disclosure.

FIG. 3B depicts an example configuration of an example computing device 330 which serves as a control node 302 within feature selection system 300. The computing device includes a transmitter 320 and a receiver 335, which the device can use to share data and information with any worker node 304. The computing device 330 also includes a multi-threaded processor 310, and a memory 312 accessible by the processor 310. The memory 312 stores a threaded basic linear algebra subprograms library 314, as well as software for implementing feature selection algorithms and controlling worker nodes 316.

The Formulation

A common problem which system 300 can effectively and efficiently solve involves selecting k variables (herinafter, the term "variable" and "feature" will be used interchangeably, and shall be understood as having the same meaning) from a large set of m available variables, each of which is quantified by n historical data samples $(x_1, \ldots, x_n)$ accessible to the system. That is, each of the m variables is associated with a vector $f_1, \ldots, f_m$ of length n, and each such vector holds zero-mean data which quantifies its corresponding variable. We will say that $X \in \mathbb{R}^{n \times m}$ is a data set (also referred to hereinafter as a "feature matrix") that contains the n samples, $x_1, \ldots, x_n$ for each of the m variables, $f_1, \ldots, f_m$ (i.e. the m columns of data set X are $f_1, \ldots, f_m$.) Also, we will say that $X=(X_1, X_2)$, where $X_1 \in \mathbb{R}^{n \times k}$ represents the k variables selected, and $X_2 \in \mathbb{R}^{n \times (m-k)}$ contains the m−k remaining ones.

Furthermore, $U_N \in \mathbb{R}^{n \times (m-k)}$ shall be understood to be the null-space of $X_1^T$. Since each row of $X_1^T$ is a variable vector, $U_N$ is the null-space corresponding to the k selected variables. Let Z be the target matrix. Variable selection based on variance preservation can be achieved by minimizing the following formulation:

$$X_1 = \arg\min x_1 (f_{i_1}, \ldots, f_{i_k}) \text{Trace}((U_N^T Z)^T (U_N^T Z)) \qquad (1)$$

Given $X_1$, $U_N$ can be obtained by applying singular vector decomposition on $X_1$. It is also easy to verify that $U_N U_N^T = X_1 (I - X_1^T X_1) X_1^T$, where I is the diagonal matrix with 1 as its diagonal elements. Therefore Equation (1) can also be written into the following form:

$$X_1 = \arg\min x_1 (f_{i_1}, \ldots, f_{i_k}) \text{Trace}(Z^T X_1 (I - X_1^T X_1) X_1^T Z). \qquad (2)$$

The Formulation as Applied to Regression

Let $Y_{reg} \in \mathbb{R}^{n \times t}$ be the response matrix containing t response vectors. Variable selection for regression can be achieved by solving the following problem:

$$X_1 = \arg\min x_1 = (f_{i_1}, \ldots, f_{i_k}) \text{Trace}(Y_{reg}^T (I - X_1 (X_1^T X_1)^{-1} X_1^T) Y_{reg}) \qquad (3)$$

The Formulation as Applied to Classification

The formulation for feature selection based on variance preservation is applicable when system 300 is used to perform feature selection for use in a classification setting. In this case, the formulation may be understood using conventions and nomenclature specific to the classification setting. For example, given that a response vector (y) has C classification levels, $\{1, \ldots, C\}$, then a response matrix $Y_{cla} \in \mathbb{R}^{n \times c}$ can be generated from y. Y can be obtained using the following equation:

$$Y_{cla,(i,j)} = \begin{cases} \left(\frac{\sqrt{1}}{n_j} - \frac{\sqrt{n_j}}{n}\right), & y_i = j \\ -\frac{\sqrt{n_j}}{n}, & y_i \neq j \end{cases} \qquad (4)$$

where $n_j$ is the number of instances in class j, and $y_i = j$ denotes that the i th instance belongs to the j th class. Variable selection for classification can be achieved by solving the following problem:

$$X_1 = \arg\min x_1 = (f_{i_1}, \ldots, f_{i_k}) \text{Trace}(Y_{cla}^T (I - X_1 (X_1^T X_1)^{-1} X_1^T) Y_{cla}) \qquad (5)$$

The Formulation as Applied to Unsupervised Learning

In an unsupervised learning setting in which selecting variables are done in a manner that preserves the maximum amount of the data variance, variable selection is achieved by solving the following problem:

$$X_1 = \arg\min x_1 = (f_{i_1}, \ldots, f_{i_k}) \text{Trace}(X_2^T (I - X_1 (X_1^T X_1)^{-1} X_1^T) X_2) \qquad (6)$$

The Efficient Solvers

When dealing with a sample of m candidate feautres, finding the k features which maximize equation (3), (5), or (6) is a combinatorial optimization problem which is NP-hard. Rather than searching for optimal solutions to these equations, system 300 uses a greedy search methodology involving k search iterations to generate high-quality, sub-optimal solutions in an efficient manner.

The Greedy Search Process for Supervised Feature Selection

The following discussion will first explain the gready search methodologies employed by system 300 in the supervised feature selection context. With regards to a supervised selection context, assume that q variables have been selected. Let $X_1$ contain the q selected variables, and let Y be the response matrix, e.g. $Y = Y_{reg}$ or $Y = Y_{cla}$. With SFS and using the criteria specified in Equation (3) or (5), in the q+1 step, a variable is selected by $$\underset{f}{\text{argmin}} \ \text{Trace}\left(Y^T\left(I - \hat{X}_1(\hat{X}_1^T\hat{X}_1)^{-1}\hat{X}_1^T\right)Y\right) \quad (7)$$

In equation (7), $\hat{X}_1$ contains variable f and the q selected variables. Also, let $$U_N = (I - X_1(X_1^TX_1)^{-1}X_1^T)^{\frac{1}{2}}.$$

It can be shown that when system 300 solves the problem specified in Expression (7), the system 300 will have effectively maximized the following expression:

$$\underset{f}{\text{argmax}} \ \frac{\left\|Y^T(I - X_1(X_1^TX_1)^{-1}X_1^T)f\right\|_2^2}{\left\|(I - X_1(X_1^TX_1)^{-1}X_1^T)^{\frac{1}{2}}f\right\|_2^2} \quad (8)$$

The above expression is a closed form solution for evaluating variable relevance in a supervised learning context. Based on Expression (8), the best variable in each search step can be selected by choosing the one with the maximum relevance score. Compared to Expression (7), Expression (8) singles out the computations that are common for evaluating different variables. This makes it possible to compute them only once in each step and therefore reduces the complexity inherent in solving the problem. In other words, the system 300 may employ equation (8) to evaluate variable relevance, while at the same time avoiding the redundant computational burden which would be imposed by reliance only on equation (7).

In the supervised feature selection context, the greedy search algorithm employed by system 300 effectively solves equation (8) at each iteration of greedy search. During each iteration, the system 300 selects the feature which maximizes equation (8).

Moreover, during each iteration, system 300 parallelizes, over a number (p) of worker nodes 304, several calculations involved in identifying the maximizing feature. Other calculations are performed at a control node 302 which distributes information for performing the parallelized calculations. For example, during each greedy search iteration after the first iteration, the control node 302 provides each worker node with information that identifies the feature selected during the most recently concluded iteration. By parallelizing the calculations over p nodes as opposed to performing all the calculations on a single node, system 300 achieves linear speedup as a function of p.

Also, system 300 achieves additional speedup of the supervised feature selection algorithm by using a tree-structured network for the sharing of information between the control node and the worker nodes. For example, the worker nodes may be layered in a tree structure which grows outwards from the control node. By using a tree structure, the communications required to execute the greedy search algorithm may be accelerated.

Let C be the number of columns in Y. The time complexity of selecting k variables using Expression (8) is $$O(mk(n+k^2)) \quad (9)$$

To obtain Expression (9), it is assumed that m>>k>C.

The Greedy Search Process for Unsupervised Feature Selection

When operating in the unsupervised feature selection context, system 300 employs a slightly different greedy search algorithm. With regards to an unsupervised context, assume that q variables have been selected. Let $X_1$ contain the q selected variables, and let $X_2$ contain the remaining ones. Using sequential forward selection and the criterion specified in Equation (6), in the q+1 step, a variable is selected by $$\underset{f}{\text{argmin}} \text{Trace}\left(\hat{X}_2^T\left(I - \hat{X}_1(\hat{X}_1^T\hat{X}_1)^{-1}\hat{X}_1^T\right)\hat{X}_2\right) \quad (10)$$

where $\hat{X}_1$ contains f and the q selected variables, and $\hat{X}_2$ contains the remaining ones. It can be shown that solving the problem specified in Expression (10) is equivalent to maximizing the following expression:

$$\underset{f}{\text{argmax}} \ \frac{\left\|X_2^T(I - X_1(X_1^TX_1)^{-1}X_1^T)f\right\|_2^2}{\left\|(I - X_1(X_1^TX_1)^{-1}X_1^T)^{\frac{1}{2}}f\right\|_2^2} \quad (11)$$

The above equation provides a closed form solution for evaluating variable relevance in a unsupervised learning context, based on which the best variable in each SFS step can be selected by choosing the one with the maximum relevance score. Compared to Expression (10), Expression (11) singles out the computations that are common for evaluating different variables. This makes it possible to compute them only once in each step and therefore improves the efficiency for solving the problem. Thus, the system 300 may evaluate variables and avoid redundant processing by performing the calculation of equation (11). Evaluated variables which reveal an appropriate level of informativeness, based on the calculations associated with equation (11), may be selected.

Let m be the number of all variables, n the number of samples, and k the number of variables to be selected. Also assume that m>>k. It can be verified in a centralized computing environment, the time complexity for selecting k variables by solving Expression (11) is:

$$O(m^2(n+k^2)) \quad (12)$$

In the preceding expression, $m^2n$ corresponds to the complexity for computing the covariance matrix. And $m^2k^2$ corresponds to selecting k variables out of m.

The Parallelized, Greedy Searching for Efficient Solutions

Figure 4:
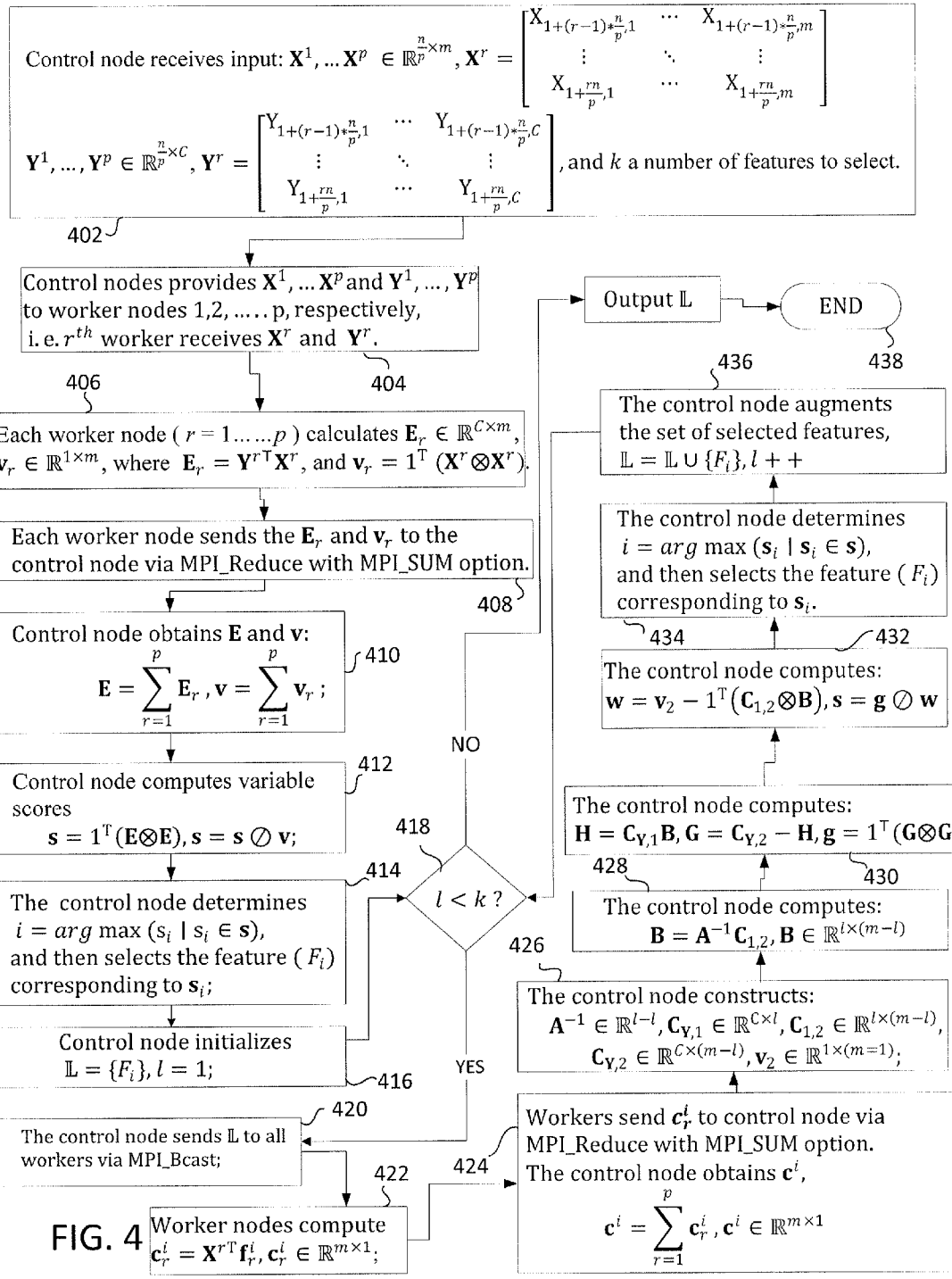
FIG. 4 is a flow diagram depicting example operations of the feature selection system during a supervised feature selection context.

FIG. 4 is a flow diagram depicting how system 300 executes supervised variable selection using a greedy search parallelized amongst p worker nodes controlled by a contol node. In FIG. 4, input feature data $(X^1, \ldots, X^p)$ is received at 402. $X^1, \ldots X^p$ are equalivalently dimensioned matrices $$\left(\text{dimensions } \frac{n}{p} \times m\right)$$

such that $(X^1, X^2 \ldots X^p) = X$, where X is the n×m feature matrix containing n zero-mean observations for each of the m features to be considered for selection. That is, $X^1$, $X^2 \ldots X^p$ are partitions of X. In this way, each of the m columns of X corresponds to a different one of the m variables.

Furthermore, at 402 the system 300 receives a response matrix Y. The response matrix may be received as p response matrix partitions which can be concatenated to form Y. Alternatively, the control node 302 may receive response matrix Y prior to the repsonse matrix being partitioned. In this case, the response matrix 302 may then partition Y into p $(Y^1, Y^2 \ldots, Y^p)$ equal partitions. In either case, $Y^1$, $Y^2 \ldots, Y^p$ are equivalently dimensioned $$\left(\frac{n}{p} \times C\right)$$

partitions of the response matrix Y, where C is the number of classification levels in the training data. At 404, the control node assigns $X^1, \ldots X^p$ and $Y^1, Y^2 \ldots, Y^p$ to the p worker nodes 304 in a distributed manner, such that the rth worker node is assigned $X^r$ and $Y^r$. At 406, each worker node 304 performs parallelized calculations as indicated in the flow diagram.

It should be understood that at 406, and everywhere in this disclosure, the symbol ⊗ indicates element-wise matrix multiplicaton, i.e. computation of the Hadamard Product. At 408, following the parallelized computations performed at 406, each worker node 304 sends $E_r$ and $V_r$ to the control node 302. The information sent at 408 may be sent via MPI_Reduce with the MPI_SUM option (both MPI_Reduce and MPI_SUM are Message Passing Interface functions). At 410, the control node receives the variable information sent, at 408, by each of the p worker nodes 304.

At 412, the control node 302 computes a variable score vector $(s = 1^T(E \otimes E))$ and then updates the variable score vector $(s = \emptyset v)$ as depicted. Here, it shall be understood that the symbol ∅ indicates element-wise matrix division. At 414, the control node 302 determines the largest element $(s_i)$ of s, and selects the feature corresponding to the feature observations in the ith column of X. At 416, the control node 302 initializes set 𝕃 to store this first selected feature, as well as the features to be subsequently selected. Also, at 416, the control node 302 initializes a counter variable l to 1.

At 418, an iterative process occurs involving k−1 additional greedy search iterations, so as to select the remaining k−1 additional features. At 418, the control node 302 verifies that l<k. The system 300 then repeats steps 418-436 until determining that l=k at 418. At 420 the control node sends 𝕃 to all the worker nodes via MPI_Bcast (MPI_Bcast is a Message Passing Interface function). At 422, each worker node 304 references the selected features in 𝕃 and performs covariance calculations as indicated on the flow diagram. For the purposes of understanding the equations shown at 422, the parallelized computations at 422 involve calculating the covariance between $F_i$ and all other variables, as summarized by the following series of vector and matrix operations:

$$c^i = X^T f_i = (X^{1^T}, \ldots, X^{p^T})(f_1^i, \ldots, f_p^i) = \sum_{r=1}^{p} c_r^i$$

Each node calculates these covariances with regards to features represented in its respective feature matrix partition. At 424, the workers send the various calculated vectors $c^i$ to the control node. Next at 426, the control node 302 constructs a series of matrices, and performs the matrix construction based on: the various vectors provided by the control nodes at 424, the feature matrix and the response matrix, as depicted in the flow diagram.

The matrices constructed at 426 may be constructed using the following relationships: $A^{-1} = (X_1^T X_1)^{-1}$, $C_{Y,1} = Y^T X_1$, $C_{Y,2} = Y^T X_2$, $C_{1,2} = X_1^T X_2$. Also, at 426, $v_2$ contains the variance of all unselected variables, and can be calculated using v calculated at 410. In each iteration of greedy search after the second iteration (e.g. once l=2), the control node may incrementally construct $A^{-1}$ and $C_{1,2}$ by updating the versions of these matrices calculated during the previous iteration. Also, at 428, it should be recognized that the matrix E obtained at 410 can be used by the control node 302 to construct $C_{Y,1}$ and $C_{Y,2}$ incrementally, such that these matrices are also based on versions calculated during previous iterations.

At 430, the control node 302 performs matrix and vector operations which result in the computation of a vector g. At 432, the control node 302 performs further matrix and vector operations, as depicted. The operations at 432 result in computation of a vector S which contains feature scores for each of the unselected features. Next, at 434, the control node 302 determines the maximum score in vector S, and selects the feature in the feature matrix which corresponds to the position of the maximum score in vector S. At 436, the control node 302 adds the selected feature to the set (𝕃) of selected features. Subsequently, the process returns to 418, at which point another iteration of steps 418-436 occurs, or the feature selection process ends.

With regards to the supervised feature selection process of FIG. 4, a tree-based mechanism may be used to develop collective operations, such as MPI_Bcast and MPI_Reduce, whenever system 300 is implemented using MPI. In this case, because both $A^{-1}$ and B can be obtained by incrementally updating their previous versions, and the time complexity for selecting k features using the algorithm of FIG. 4 is $$CPU\left(mk\left(\frac{n}{p} + k^2\right)\right) + NET(m(C+k)\log p) \qquad (14)$$

where C is the number of columns in Y, CPU is the average time to perform a computation during execution of the algorithm, and NET is the average node-node communication time delay during execution of the algorithm.

Figure 5:
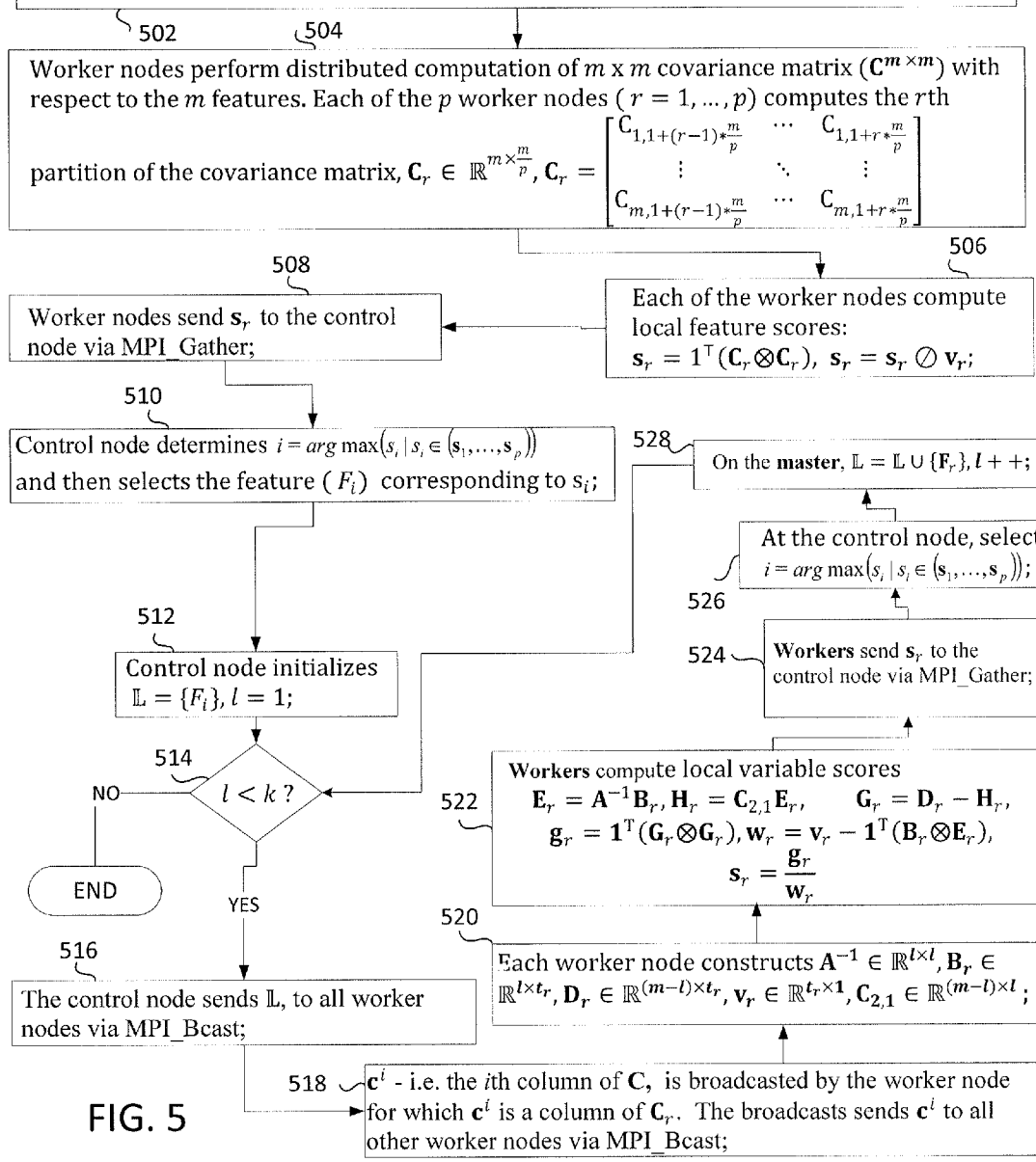
FIG. 5 is a flow diagram depicting example operations of the feature selection system during an unsupervised feature selection context.

FIG. 5 depicts example parallelized, greedy search processes which system 300 may utilize to perform unsupervised feature selection. As depicted at 502, system 300 receives p inputted partitions of a feature matrix X, i.e. partitions $X^1, \ldots X^p$. The feature matrix X shall be understood to be the n×m matrix described previously, with regards to equation (1) and FIG. 4. As an alternative to receiving partitions of the feature matrix, system 300 may receive the entire feature matrix, and subsequently partition the matrix into the p sub-matrices depicted at 502. Additionally, at 502, each of the p worker nodes (i.e. r=1, 2, …p) is uniquely assigned to one of the p feature matrix partitions.

At 504, the worker nodes 304 perform distributed computation of the m×m covariance matrix with respect to the m features represented in the feature matrix. As depicted, the distributed computation involves each worker node computing $$\frac{m}{p}$$

columns of the covariance matrix. For each worker node 304, the covariance matrix columns which the worker node 304 computes are the columns which correspond to those columns within the feature matrix partition that is assigned to the worker.

At 506, each of the worker nodes 304 calculates feature scores as depicted in the flow diagram. As depicted, at each worker node 304, the computed feature scores are based on the covariance matrix partition calculated at the node. At each worker node 304, the feature scores are computed with respect to the $$\frac{m}{p}$$

features that correspond to the columns within the feature matrix partition assigned to the worker node 304. Moreover, at each worker node 304, the feature scores are contained within a vector ($s_r$).

Subsequently, at 508, each worker node 304 sends its most recently computed feature score vector ($s_r$) to the control node 302. This communication of feature score vectors may be performed using MPI_Gather (MPI_Gather is a Message Passing Interface function).

At 510, the control node 302 evaluates all the feature score vectors ($s_1, s_2, \ldots s_r$) to determine the highest feature score element found amongst the vectors. Once the highest element is found, the control node 302 selects the feature (the first selected feature) corresponding to the highest feature score.

At 512, the control node 302 initializes a list L for use in storing the feature matrix column indexes of selected features. The column index of the first selected feature (selected at 510) is included in the set. At 514, system 300 commences the second greedy search iteration by verifying that l<k. Subsequently, system 300 repeatedly performs steps 514-528, in that order, until l=k. When l=k at 514, system 300 detects that k iterations of greedy search have been performed, and ceases to perform further iterations.

Steps 516-528 will now be explained in detail. At 516, the control node 302 sends set $\mathbb{L}$ to all worker nodes. Here, the set may be sent using MPI_Bcast. At 518, each worker node 304 evaluates its respective correlation matrix partition $C_r$ to determine if the partition includes the column of the correlation matrix which corresponds to the most recently selected feature. The worker node 304 which locates this column within its respective correlation matrix then sends the column (which may be conceptualized as a column vector) to all other nodes via MPI_Bcast.

At 520, each worker node 304 constructs a series of matrices, as described in the flow diagram. For the purposes of understanding the matrices constructed at 520, let $L_r$ contain the index of unselected features on the r th worker, and $L_u$ contain the index of all unselected features. Then $A^{-1}=(X_1^TX_1)^{-1}=C_{L\times L}$ is a symmetric matrix that contains the covariance of the selected features, $B_r=X_1X^r=C_{L\times L_r}$ contains the covariance between the selected features and the unselected features within the feature matrix partition assigned to the r th worker node 304, $D_r=X_2^TX^r=C_{L_u\times L_r}$ contains the covariance between all unselected features and the unselected features within the feature matrix partition assigned to the r th worker node 304, $v_r$ contains the variance of the unselected features within the feature matrix partition assigned to the r th worker node 304; and $C_{2,1}=X_2^TX_1$ contains the covariance between all selected and unselected features.

The matrices constructed at 520 enable each worker node 304 to further compute a vector $s_r$ containing feature scores for all unselected features represented in the worker node's assigned feature matrix partition. The series of computations used by each worker node 304 to determine $s_r$ is depicted at 522. Subsequently, at 524, each worker node 304 sends $s_r$ to the control node via MPI_Gather.

At 526, the control node 302 determines the highest received feature score within the vectors sent by the worker nodes at 524. The feature which corresponds to this highest feature score is then selected and added to set $\mathbb{L}$ at 528. Additionally, system 300 increments counting variable l at 528. Depending on the value of variable l at 514, system 300 may perform subsequent iterations of steps 516-528. As mentioned previously, however, system 300 ceases the iterative process once l=k. Subsequent to the iterative process terminating, the features indexed by set $\mathbb{L}$ may then be used in any modeling process or other context in which the features may provide explanatory or predictive value.

Figure 6:
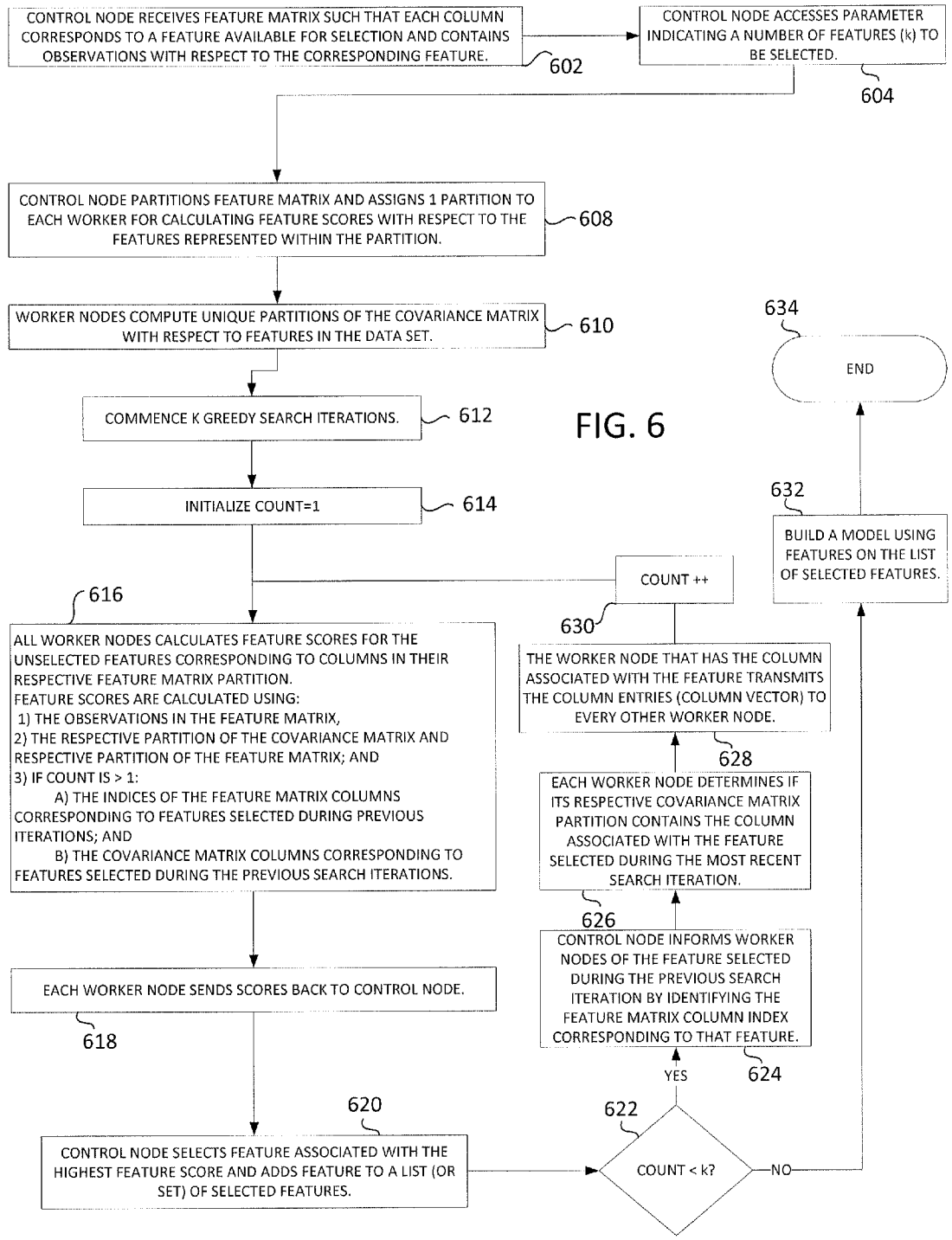
FIG. 6 is a flow diagram depicting example operations of the feature selection system during an unsupervised feature selection context.

FIG. 6 provides a generalized description of the unsupervised variable selection greedy search algorithm used by system 300. As depicted at 602, the control node 302 receives a feature matrix such that each column of the feature matrix corresponds to a feature available for selection, and also contains observations with respect to the corresponding feature. With respect to each feature, the observations are zero-mean observations, i.e. the observation average is subtracted from each observation.

At 604, the control node 302 accesses a parameter (k) which indicates a number of features to be selected. At 608, the control node 302 partitions the feature matrix and assigns one partition to each worker node 304. Each worker node 304 will later use its respective feature matrix partition to perform calculations used in determining the features to select.

At 610, the worker nodes 304 compute unique partitions of the covariance matrix with respect to the features represented in the feature matrix. As depicted at 504 in FIG. 5, the partition which a worker node 304 computes corresponds to the partition of the feature matrix assigned to the node. At 612, k greedy search iterations begin. A variable (count) is initialized to 1 at 614. System 300 thereafter uses count to keep track of the number of features selected as the greedy search algorithm is executed.

At 616, the worker nodes 304 calculate feature scores for the unselected features in their respective feature matrix partition. For each worker node 304, this calculation process involves using the respective partition of the covariance matrix and respective partition of the feature matrix. If count is >1, the calculation process also involves the indices of feature matrix columns corresponding to features selected during previous iterations, and the covariance matrix columns corresponding to features selected during the previous search iterations.

At 618, each worker node 304 sends the feature scores most recently computed (at 616) to the control node 302. After receiving the feature scores, the control node 302 selects the feature associated with the highest feature score and adds the selected feature to a list (or set) of selected features.

As depicted at 622, system 300 then determines if count is less than k. If count is less than k, then, at 624, the control node 302 informs all the worker nodes 304 of the feature most recently selected. The control node 302 provides this information by indicating the feature matrix column corresponding to the most recently selected feature. Subsequently, at 626, each worker node 304 determines if its respective covariance matrix partition contains the column associated with the most recently selected feature. At 628, the elements of the covariance matrix column associated with the most recently selected feature are sent to all worker nodes 304. Here, the sending is performed by the worker node 304 which encountered the column within its covariance matrix partition, at 618. Next, the variable count is incremented at 630, and steps 616-630 are repeated in that order until count=k at 622.

Once the exit condition at 622 is satisfied (i.e., once the system 300 has selected k features), a model or other predictive or forecasting mechanism may be built, at 632, using the selected features.

Figure 7:
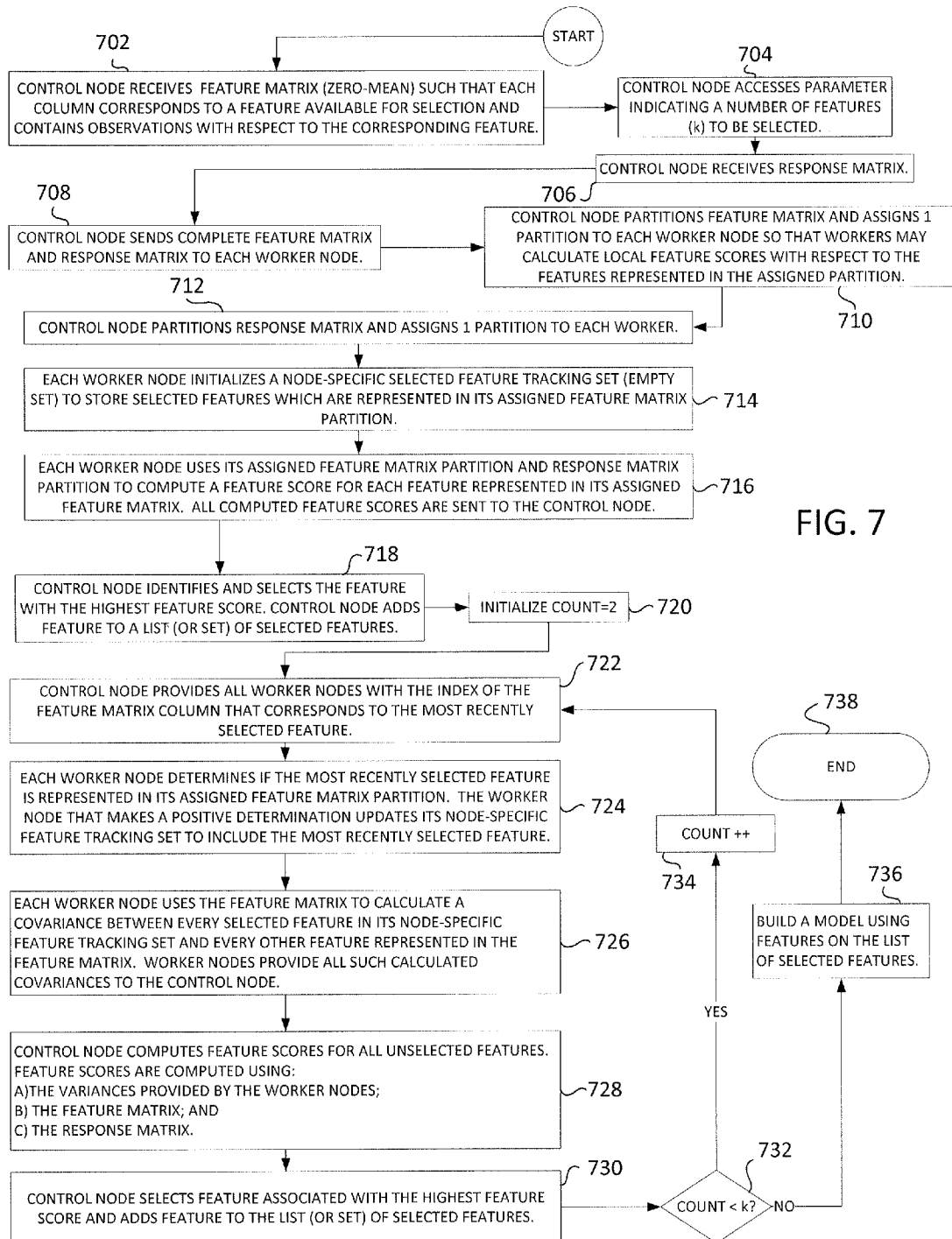
FIG. 7 is a flow diagram depicting example operations of the feature selection system during a supervised feature selection context.

FIG. 7 is a flow diagram depicting example operations which system 300 may utilize to perform supervised feature selection. The system 300 commences the operations at 702. As depicted at 702, the control node 302 may receive a feature matrix containing zero-mean data. The feature matrix may be organized such that each column corresponds to a feature available for selection, and contains observations with respect to the corresponding feature.

At 704, the control node accesses a parameter (k) indicating a number of features represented in the feature matrix which are to be selected. At 706, the control node 302 receives a response matrix containing target data (in the case of linear regression) or target classifications (in the case of classification). Next, at 708, the control node 302 sends the complete feature matrix and response matrix to each worker node. At 710, the control node partitions the feature matrix and assigns one partition to each worker node so that the worker nodes 304 may calculate local feature scores with respect to the features represented in their respective assigned partitions.

At 712, the control node 302 partitions the response matrix and assigns one partition to each worker node. Next, at 714, each worker node initializes a node-specific selected feature tracking set to store selected features which are represented in its assigned feature matrix partition.

At 716, each worker node 304 uses its assigned feature matrix partition and response matrix partition to compute a feature score for each feature represented in its assigned feature matrix. All computed feature scores are then sent from the worker nodes 302 to the control node 302. At 718, the control node 302 identifies and selects the feature corresponding to the highest feature score. The control node 302 adds that feature to a list (or set) of selected features, thereby completing the first greedy search iteration.

At 720, the system 300 initializes the variable count to 2 so that k−1 additional greedy search iterations can be performed. Subsequently, system 300 performs steps 722-734 repeatedly, and in order, until the variable count is detected as being equal to k at 732.

At 722, the control node 302 provides all worker nodes 304 with the index of the feature matrix column that corresponds to the most recently selected feature. At 724, each worker node 304 determines if the most recently selected feature is represented in its assigned feature matrix partition. At this point, the worker node 304 which makes a positive determination then updates its node-specific feature tracking set to include the most recently selected feature.

At 726, each worker node 304 uses the feature matrix to calculate a covariance between every selected feature in its node-specific feature tracking set and every other feature represented in the feature matrix. The worker nodes 304 provide all such calculated covariance values to the control node.

At 728, the control node 302 computes feature scores for all unselected features. The control node computes the feature scores using the variances most recently provided by the worker nodes (at 728), the feature matrix, and the response matrix.

At 730, the control node 302 selects the feature associated with the highest feature score. The control node adds the selected feature to the list of selected features. At 732, system 300 determines if count continues to be less than k. If count is less than k, then count is incremented at 734, and a subsequent greedy search iteration commences at 722. Otherwise, if count is no longer less than k, a model may be built using the selected features, as depicted at 736.

In the aforementioned descriptions, specific details are given so as to enable a thorough understanding of certain of the various embodiments of the disclosed techniques, systems, methods, processes and the like. However, any such embodiments within the scope of this disclosure need not be characterized by these specific details. Also, well-known circuits, processes, algorithms, structures, and techniques have been shown without unnecessary detail in order to avoid obscuring the embodiments.

This description provides example embodiments only, and is not intended to limit the scope, applicability, or configuration of the disclosed subject matter. Rather, the preceding description of certain of the many embodiments will provide those skilled in the art with an enabling description which will facilitate implementation of the subject matter of this disclosure. Various changes may be made in the function and arrangement of elements without departing from the spirit and scope of the disclosed subject matter.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Where the embodiments involve firmware and/or software implementation, certain functionality may be provided through instructions or code stored on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the disclosed subject matter. Also, a number of steps may be undertaken before, during, or after the above elements are considered. Accordingly, the above description does not limit the scope of the disclosure.

What is claimed is:

1. A computer-implemented method for relevance detection and dimensionality reduction in a big data parallelized computing environment to effectively minimize selection of redundant features, the method comprising:
   accessing a first set of features, wherein the first set of features includes multiple features, wherein the features of the first set of features are characterized by a variance measure, and wherein accessing the first set of features includes using a computing system to access the features;
   determining components of a covariance matrix, the components of the covariance matrix indicating a covariance with respect to pairs of features in the first set;
   selecting multiple features from the first set of features in a first iteration, wherein selecting multiple features in the first iteration is based on the determined components of the covariance matrix and an amount of the variance measure attributable to the selected multiple features;
   determining relevance scores for the selected multiple features from the first set of features in the first iteration;
   determining exactly one feature of the selected multiple features in the first iteration, wherein the single feature has the highest relevance score of the selected multiple features; and
   selecting multiple features of a second set of features in a second iteration, wherein the second set of features includes the determined single feature.

2. The method of claim 1, wherein executing the greedy search includes:
   using multithreading in a symmetric multiprocessing mode; and
   executing a greedy search algorithm implemented using a basic linear algebra subprograms (BLAS) library.

3. The method of claim 1, wherein using parallelized computation includes using Message Passing Interface in a parallel processing mode.

4. The method of claim 1, wherein the parallelized computation involves p worker nodes, wherein the multiple selected features consist of k selected features, wherein the multiple features included in the first set of features consist of m features, wherein k is less than m, and wherein p is a factor of m.

5. The method of claim 4, wherein using parallelized computation includes using a parallelized algorithm characterized by a time complexity that is linear with respect to p.

6. The method of claim 4, wherein using parallelized computation includes using a parallelized algorithm characterized by a time complexity that is a $3^{rd}$ order polynomial function of k.

7. The method of claim 4, wherein determining components of the covariance matrix includes using an algorithm characterized by a time complexity function which is a quadratic function of m.

8. The method of claim 4, wherein selecting the multiple features is done in an unsupervised variable selection context, and wherein determining components of the covariance matrix includes:
   computing the entire covariance matrix with regards to n observations for each feature in the first set; and
   using a distributed algorithm characterized by the following time complexity function:

$$CPU\left(\frac{m^2(n+k^2)}{p} + m^2\log(p)\right),$$

wherein CPU is an average computation time for computations associated with the algorithm.

9. The method of claim 4, wherein selecting the multiple features is performed in an unsupervised feature selection context, and wherein executing the greedy search includes:
   performing multiple greedy search iterations, wherein selecting multiple features from the first set includes selecting exactly one of the features during each of performed greedy search iteration.

10. The method of claim 9, wherein, each worker node uses multi-threading to perform a series of matrix-matrix operations during each of the greedy search iterations.

11. The method of claim 10, wherein, during each of the multiple greedy search iterations subsequent to the first greedy search iteration, each worker node:
   computes a covariance vector with respect each of the features selected during preceding greedy search iterations,
   wherein the covariance vectors are used to construct a variable score vector.

12. The method of claim 11, wherein, during each of the multiple greedy search iterations subsequent the first greedy search iteration, selecting one of the multiple features is based on the variable score vector calculated during that iteration.

13. The method of claim 12, further comprising:
   generating a response matrix comprising n rows or n columns, wherein each of the multiple historical observations is an element of the response matrix.

14. The method of claim 13, further comprising:
   partitioning the response matrix into exactly p submatrices, wherein all of the submatrices are identically dimensioned; and
   assigning the p sub-matrices amongst the p worker nodes by providing each of the p worker nodes with a different one of the p sub-matrices.

15. The method of claim 14, wherein:
   performing the greedy search includes executing a greedy search algorithm characterized by the following computational time complexity:

$$CPU\left(mk\left(\frac{n}{p} + k^2\right)\right),$$

wherein CPU is an average computation time of computations associated with executing the greedy search algorithm.

16. The method of claim 9, wherein determining components of the covariance matrix comprises:
computing p partitions of the covariance matrix, wherein each of the p worker nodes computes exactly one of the partitions, and wherein computing the partitions is performed prior to a first iteration of greedy search.

17. The method of claim 16, further comprising:
assigning the p partitions amongst the p worker nodes such that each worker node is assigned exactly one of the p partitions.

18. The method of claim 17, wherein each of the p partitions is of dimension $$m \times \frac{m}{p},$$

and wherein assigning the p partitions includes using a tree-based distribution mechanism involving the p nodes, wherein the tree-based distribution mechanism has log(p) levels of nodes.

19. The method of claim 17, wherein, as part of the first greedy search iteration, each of the worker nodes:
calculates a first iteration variable score vector based on its assigned partition, wherein each such first iteration variable score vector comprises $$\frac{m}{p}$$

variable scores.

20. The method of claim 19, wherein the method further comprises:
accessing each of the first iteration variable score vectors.

21. The method of claim 20, further comprising:
identifying a largest variable score vector element amongst the accessed first iteration variable score vectors; and
selecting one of the features based on the identified largest variable score vector element.

22. The method of claim 21, further comprising:
providing each of the p worker nodes with an indication of the feature selected based on the identified largest variable score vector element.

23. The method of claim 1, wherein computing components of the covariance matrix includes using distributed matrix-matrix multiplication techniques.

24. The method of claim 1, further comprising:
accessing multiple historical observations associated with a dependent variable to be modeled using the selected features; and
modeling the dependent variable using the multiple historical observations and the multiple selected features.

25. A system for relevance detection and dimensionality reduction in a big data parallelized computing environment to effectively minimize selection of redundant features, the system comprising:
one or more processing units;
one or more non-transitory computer-readable storage mediums comprising instructions configured to cause the one or more processing units to perform operations including:
accessing a first set of features, wherein the first set of features includes multiple features, and wherein the features of the first set of features are characterized by a variance measure;
determining components of a covariance matrix, the components of the covariance matrix indicating a covariance with respect to pairs of features in the first set;
selecting multiple features from the first set of features in a first iteration, wherein selecting multiple features in the first iteration is based on the determined components of the covariance matrix and an amount of the variance measure attributable to the selected multiple features;
determining relevance scores for the selected multiple features from the first set of features in the first iteration;
determining exactly one feature of the selected multiple features in the first iteration, wherein the single feature has the highest relevance score of the selected multiple features; and
selecting multiple features of a second set of features in a second iteration, wherein the second set of features includes the determined single feature.

26. The system of claim 25, wherein executing the greedy search includes:
using multithreading in a symmetric multiprocessing mode; and
executing a greedy search algorithm implemented using a basic linear algebra subprograms (BLAS) library.

27. The system of claim 25, wherein using parallelized computation includes using Message Passing Interface in a parallel processing mode.

28. The system of claim 25, wherein the parallelized computation involves p worker nodes, wherein the multiple selected features consist of k selected features, wherein the multiple features included in the first set of features consist of m features, wherein k is less than m and wherein p is a factor of m.

29. The system of claim 28, wherein using the parallelized computation includes using a parallelized algorithm characterized by a time complexity that is linear with respect to p.

30. The system of claim 28, wherein using the parallelized computation includes using a parallelized algorithm characterized by a time complexity that is a $3^{rd}$ order polynomial function of k.

31. The system of claim 30, wherein the operations further comprise:
providing each of the p worker nodes with an indication of the feature selected based on the identified largest variable score vector element.

32. The system of claim 28, wherein determining the components of the covariance matrix includes using an algorithm characterized by a time complexity function which is a quadratic function of m.

33. The system of claim 28, wherein selecting the multiple features is done in an unsupervised variable selection context, and wherein determining the components of the covariance matrix includes computing the entire covariance matrix:
with regards to n observations for each feature in the first set; and
using a distributed algorithm characterized by the following time complexity function:

$$CPU\left(\frac{m^2(n+k^2)}{p} + m^2 \log(p)\right),$$

wherein CPU is an average computation time for computations associated with the algorithm.

34. The system of claim 28, wherein executing the greedy search includes:
performing multiple greedy search iterations, wherein selecting multiple features from amongst the features of the first set includes selecting exactly one of the features during each of the performed greedy search iterations.

35. The system of claim 34, wherein, each worker node uses multi-threading to perform a series of matrix-matrix operations during each of the greedy search iterations.

36. The system of claim 35, wherein, during each of the multiple greedy search iterations subsequent to the first greedy search iteration, each worker node:
computes a covariance vector with respect each of the features selected during the preceding greedy search iterations, wherein the covariance vectors are used to construct a variable score vector.

37. The system of claim 36, wherein, during each of the multiple greedy search iterations subsequent the first greedy search iteration, selecting one of the multiple features is based on the variable score vector calculated during that iteration.

38. The system of claim 37, wherein the operations further comprise:
generating a response matrix comprising n rows or n columns, wherein each of the multiple historical observations is an element of the response matrix.

39. The system of claim 38, wherein the operations further comprise:
partitioning the response matrix into exactly p submatrices, wherein all of the submatrices are identically dimensioned; and
assigning the p sub-matrices amongst the p worker nodes by providing each of the p worker nodes with a different one of the p sub-matrices.

40. The system of claim 39, wherein:
performing the greedy search includes executing a greedy search algorithm characterized by the following computational time complexity:

$$CPU\left(mk\left(\frac{n}{p}+k^2\right)\right)$$

wherein CPU is an average computation time of computations associated with executing the greedy search algorithm.

41. The system of claim 34, wherein determining the components of the covariance matrix comprises:
computing p partitions of the covariance matrix, wherein each of the p worker nodes computes exactly one of the partitions, and wherein computing the partitions is performed prior to a first iteration of greedy search.

42. The system of claim 41, wherein the operations further comprise:
assigning the p partitions amongst the p worker nodes such that each worker node is assigned exactly one of the p partitions.

43. The system of claim 42, wherein each of the p partitions is of dimension $$m \times \frac{m}{p},$$

and wherein assigning p partitions includes using a tree-based distribution mechanism involving the p nodes, wherein the tree-based distribution mechanism has log(p) levels of nodes.

44. The system of claim 42, wherein, as part of the first greedy search iteration, each of the worker nodes:
calculates a first iteration variable score vector based on its assigned partition, wherein each such first iteration variable score vector comprises $$\frac{m}{p}$$

variable scores.

45. The system of claim 44, wherein the operations further comprise:
accessing each of the first iteration variable score vectors.

46. The system of claim 45, wherein the operations further comprise:
identifying a largest variable score vector element amongst the accessed first iteration variable score vectors; and
selecting one of the features based on the identified largest variable score vector element.

47. The system of claim 25, further comprising:
accessing multiple historical observations associated with a dependent variable to be modeled using the selected features; and
modeling the dependent variable using the multiple historical observations and the multiple selected features.

48. The system of claim 25, wherein determining components of the covariance matrix includes using distributed matrix-matrix multiplication techniques.

49. A computer-program product for relevance detection and dimensionality reduction in a big data parallelized computing environment to effectively minimize selection of redundant features, the computer-program product tangibly embodied in a machine-readable non-transitory storage medium, including instructions configured to cause a data processing apparatus to perform operations comprising:
accessing a first set of features, wherein the first set of features includes multiple features, and wherein the features of the first set of features are characterized by a variance measure;
determining components of a covariance matrix, the components of the covariance matrix indicating a covariance with respect to pairs of features in the first set;
selecting multiple features from the first set of features in a first iteration, wherein selecting multiple features in the first iteration is based on the determined components of the covariance matrix and an amount of the variance measure attributable to the selected multiple features,
determining relevance scores for the selected multiple features from the first set of features in the first iteration;
determining exactly one feature of the selected multiple features in the first iteration, wherein the single feature has the highest relevance score of the selected multiple features; and
selecting multiple features of a second set of features in a second iteration, wherein the second set of features includes the determined single feature.

50. The computer-program of claim 49, wherein executing the greedy search includes:

using multithreading in a symmetric multiprocessing mode; and executing a greedy search algorithm implemented using a basic linear algebra subprograms (BLAS) library.

51. The computer-program of claim 49, wherein performing the parallelized computation includes using Message Passing Interface in a parallel processing mode.

52. The computer-program of claim 49, wherein the parallelized computation involves p worker nodes, wherein the multiple selected features consist of k selected features, wherein the multiple features included in the first set of features consist of m features, wherein k is less than m and wherein p is a factor of m.

53. The computer-program of claim 52, wherein using the parallelized computation includes using a parallelized algorithm characterized by a time complexity that is linear with respect to p.

54. The computer-program of claim 52, wherein using the parallelized computation includes using a parallelized algorithm characterized by a time complexity that is a $3^{rd}$ order polynomial function of k.

55. The computer-program product of claim 54, wherein the operations further comprise:
providing each of the p worker nodes with an indication of the feature selected based on the identified largest variable score vector element.

56. The computer-program of claim 52, wherein determining components of the covariance matrix includes using an algorithm characterized by a time complexity function which is a quadratic function of m.

57. The computer-program of claim 52, wherein selecting the multiple features is done in an unsupervised variable selection context, and wherein determining components of the covariance matrix includes computing the entire covariance matrix:
with regards to n observations for each feature in the first set; and
using a distributed algorithm characterized by the following time complexity function:

$$CPU\left(\frac{m^2(n+k^2)}{p} + m^2\log(p)\right),$$

wherein CPU is an average computation time for computations associated with the algorithm.

58. The computer-program of claim 52, wherein selecting the multiple features is performed in an unsupervised feature selection context, and wherein executing the greedy search includes:
performing multiple greedy search iterations, wherein selecting multiple features of the first set includes selecting exactly one of the features during each of the performed greedy search iterations.

59. The computer-program product of claim 58, wherein, each worker node uses multi-threading to perform a series of matrix-matrix operations during each of the greedy search iterations.

60. The computer-program product of claim 59, wherein, during each of the multiple greedy search iterations subsequent to the first greedy search iteration, each worker node:
computes a covariance vector with respect each of the features selected during the preceding greedy search iterations,
wherein the covariance vectors are used to construct a variable score vector.

61. The computer-program product of claim 60, wherein, during each of the multiple greedy search iterations subsequent the first greedy search iteration, selecting one of the multiple features is based on the variable score vector calculated during that iteration.

62. The computer-program product of claim 61, wherein the operations further comprise:
generating a response matrix comprising n rows or n columns, wherein each of the multiple historical observations is an element of the response matrix.

63. The computer-program product of claim 62, wherein the operations further comprise:
partitioning the response matrix into exactly p submatrices, wherein all of the submatrices are identically dimensioned; and
assigning the p sub-matrices amongst the p worker nodes by providing each of the p worker nodes with a different one of the p sub-matrices.

64. The computer-program product of claim 63, wherein:
performing the greedy search includes executing a greedy search algorithm characterized by the following computational time complexity:

$$CPU\left(mk\left(\frac{n}{p} + k^2\right)\right)$$

wherein CPU is an average computation time of computations associated with executing the greedy search algorithm.

65. The computer-program product of claim 58, wherein determining the components of the covariance matrix comprises:
computing p partitions of the covariance matrix, wherein each of the p worker nodes computes exactly one of the partitions, and wherein computing the partitions is performed prior to a first iteration of greedy search.

66. The computer-program product of claim 65, wherein the operations further comprise:
assigning the p partitions amongst the p worker nodes such that each worker node is assigned exactly one of the p partitions.

67. The computer-program product of claim 66, wherein each of the p partitions is of dimension $$m \times \frac{m}{p},$$

and wherein assigning the p partitions includes using a tree-based distribution mechanism involving the p nodes, wherein the tree-based distribution mechanism has log(p) levels of nodes.

68. The computer-program product of claim 66, wherein, as part of the first greedy search iteration, each of the worker nodes:
calculates a first iteration variable score vector based on its assigned partition, wherein each such first iteration variable score vector comprises $$\frac{m}{p}$$

variable scores.

69. The computer-program product of claim 68, wherein the operations further comprise:
    accessing each of the first iteration variable score vectors.

70. The computer-program product of claim 69, wherein the operations further comprise:
    identifying a largest variable score vector element amongst the accessed first iteration variable score vectors; and
    selecting one of the features based on the identified largest variable score vector element.

71. The computer-program product of claim 49, wherein computing components of the covariance matrix includes using distributed matrix-matrix multiplication techniques.

72. The computer-program product of claim 49, further comprising:
    accessing multiple historical observations associated with a dependent variable to be modeled using the selected features; and
    modeling the dependent variable using the multiple historical observations and the multiple selected features.

* * * * *